(12) United States Patent
Yamasaki et al.

(10) Patent No.: US 10,511,057 B2
(45) Date of Patent: Dec. 17, 2019

(54) NON-AQUEOUS ELECTROLYTE SECONDARY BATTERY AND A METHOD FOR PRODUCING THE SAME

(71) Applicant: TOYOTA JIDOSHA KABUSHIKI KAISHA, Toyota-shi, Aichi (JP)

(72) Inventors: Hiroshi Yamasaki, Nagoya (JP); Tomoko Nagao, Toyota (JP); Tomohiro Nakano, Okazaki (JP); Tatsuya Hashimoto, Osaka (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 913 days.

(21) Appl. No.: 14/976,117

(22) Filed: Dec. 21, 2015

(65) Prior Publication Data

US 2016/0190645 A1    Jun. 30, 2016

(30) Foreign Application Priority Data

Dec. 25, 2014 (JP) .................. 2014-261924

(51) Int. Cl.
| | |
|---|---|
| *H01M 10/00* | (2006.01) |
| *H01M 10/0567* | (2010.01) |
| *H01M 10/0568* | (2010.01) |
| *H01M 10/052* | (2010.01) |
| *H01M 10/058* | (2010.01) |
| *H01M 10/0569* | (2010.01) |

(52) U.S. Cl.
CPC ..... *H01M 10/0567* (2013.01); *H01M 10/052* (2013.01); *H01M 10/058* (2013.01); *H01M 10/0568* (2013.01); *H01M 10/0569* (2013.01); *H01M 2220/20* (2013.01); *H01M 2300/0025* (2013.01); *Y02E 60/122* (2013.01); *Y02T 10/7011* (2013.01)

(58) Field of Classification Search
CPC .......... H01M 10/0567; H01M 10/052; H01M 10/0568; H01M 10/0569; H01M 10/058; H01M 2220/20; H01M 2300/0025; Y02T 10/7011; Y02E 60/122
USPC ...................................................... 429/163
See application file for complete search history.

(56) References Cited

U.S. PATENT DOCUMENTS

| | | | |
|---|---|---|---|
| 2002/0018940 A1 | 2/2002 | Nirasawa et al. | |
| 2014/0066290 A1* | 3/2014 | Koshino | H01M 4/9008 502/159 |

(Continued)

FOREIGN PATENT DOCUMENTS

| | | |
|---|---|---|
| CN | 1322028 A | 11/2001 |
| JP | 2002008720 A | 1/2002 |
| JP | 2005-71865 A | 3/2005 |

(Continued)

*Primary Examiner* — Nicholas P D'Aniello
(74) *Attorney, Agent, or Firm* — Sughrue Mion, PLLC

(57) ABSTRACT

Provided is a method for producing a non-aqueous electrolyte secondary battery with which resistance increase is inhibited during high-temperature storage while good battery properties are retained. The production method of this invention comprises a step of obtaining a positive electrode, a negative electrode and a non-aqueous electrolyte; and a step of placing the positive electrode, the negative electrode and the non-aqueous electrolyte in a battery case. Herein, the non-aqueous electrolyte comprises a fluorine atom-containing supporting salt and a benzothiophene oxide.

7 Claims, 1 Drawing Sheet

(56) References Cited

U.S. PATENT DOCUMENTS

| | | | |
|---|---|---|---|
| 2014/0113202 A1* | 4/2014 | Sun | H01M 10/052 |
| | | | 429/328 |
| 2014/0134501 A1* | 5/2014 | Li | H01M 10/052 |
| | | | 429/339 |

FOREIGN PATENT DOCUMENTS

| | | |
|---|---|---|
| JP | 2007273394 A | 10/2007 |
| KR | 10-2001-0098648 A | 11/2001 |

* cited by examiner

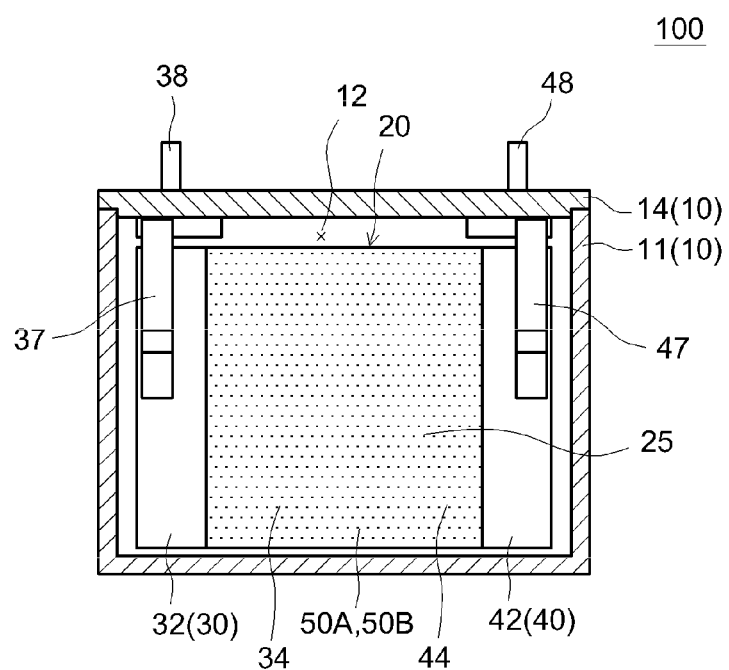

NON-AQUEOUS ELECTROLYTE SECONDARY BATTERY AND A METHOD FOR PRODUCING THE SAME

CROSS-REFERENCE

The present application claims priority to Japanese Patent Application No. 2014-261924 filed on Dec. 25, 2014, the entire contents of which are incorporated herein by reference.

BACKGROUND OF THE INVENTION

1. Field of the Invention

The present invention relates to a non-aqueous electrolyte secondary battery and a method for producing the same. In particular, it relates to a non-aqueous electrolyte secondary battery that can be applied to a power source to drive a vehicle and a method for producing the same.

2. Description of the Related Art

Non-aqueous electrolyte secondary batteries are used in a broad range of fields, such as power sources for electrically-driven vehicles and batteries installed in electronics such as personal computers, mobile terminals, etc. For instance, lithium secondary batteries which are lightweight, yet provide high energy density are preferably used as high output power sources installed in vehicles such as electric automobiles, hybrid automobiles and the like. In the lithium secondary batteries and other non-aqueous electrolyte secondary batteries, non-aqueous electrolytes comprising a carbonate-based non-aqueous solvent such as ethylene carbonate and a lithium salt such as $LiPF_6$ are typically used. Literatures disclosing this type of conventional art include Japanese Patent Application Publication No. 2005-71865.

SUMMARY OF THE INVENTION

In a non-aqueous electrolyte secondary battery as those described above, the capacity may decrease when stored at a high temperature. This may be caused primarily by a highly resistive coating formed on the surface of the negative electrode active material due to the high-temperature storage. In particular, at a high temperature, for example, at or above 50° C., a non-aqueous electrolyte comprising a fluorine atom-containing supporting salt such as $LiPF_6$ reacts with a minute amount of water contained in the electrolyte during the battery construction thereby to form hydrofluoric acid (HF). For instance, with respect to $LiPF_6$, hydrofluoric acid forms via the following reactions:

$$LiPF_6 \rightarrow LiF + PF_5 \quad (S1)$$

$$PF_5 + H_2O \rightarrow POF_3 + 2HF \quad (S2)$$

The resulting hydrofluoric acid accelerates dissolution of component(s) of the positive electrode active material, and from the dissolved component(s), a highly resistive coating is formed on the negative electrode active material. The coating is thought to increase the resistance and cause a decrease in capacity.

Based on the understandings described above, the present inventors have conducted earnest studies about means to inhibit the resistance increase during storage at a high temperature and have come to complete this invention. Thus, an objective of the present invention is to provide a method for producing a non-aqueous electrolyte secondary battery with which resistance increase is inhibited during high-temperature storage while great battery properties are retained. Another objective of the present invention is to provide the non-aqueous electrolyte secondary battery.

To achieve the objectives, the present invention provides a method for producing a non-aqueous electrolyte secondary battery. The production method comprises a step of obtaining a positive electrode, a negative electrode and a non-aqueous electrolyte; and a step of placing the positive electrode, the negative electrode and the non-aqueous electrolyte in a battery case. Herein, the non-aqueous electrolyte comprises a fluorine atom-containing supporting salt and a benzothiophene oxide. The amount of the benzothiophene oxide added in the non-aqueous electrolyte can be typically 0.2 to 1.0% by weight. The negative electrode comprises a negative current collector and a negative electrode material layer placed on the negative current collector. The negative electrode material layer preferably has a BET specific surface area of 2.0 $m^2$/g to 4.9 $m^2$/g.

According to such a constitution, the benzothiophene oxide in the non-aqueous electrolyte inhibits the resistance increase caused by the fluorine atoms in the fluorine atom-containing supporting salt during high-temperature storage. In particular, by setting the amount of the benzothiophene oxide in the non-aqueous electrolyte within a prescribed range, the effect of the added benzothiophene oxide is sufficiently produced to inhibit the resistance increase during high-temperature storage. It also inhibits the resistance increase during high-temperature storage caused by the oxide added in excess. By setting the BET specific surface area of the negative electrode material layer within a prescribed range, the initial resistance is sufficiently reduced to yield excellent capacity retention (typically capacity retention during high-temperature storage). Thus, the production method of the present invention provides a non-aqueous electrolyte secondary battery with which resistance increase is inhibited during high-temperature storage while great battery properties are retained.

The present invention provides a non-aqueous electrolyte secondary battery comprising a positive electrode, a negative electrode, and a battery case housing the positive and negative electrodes. In the secondary battery, a non-aqueous electrolyte is contained in the battery case. Herein, the non-aqueous electrolyte placed in the battery case comprises a fluorine atom-containing supporting salt and a benzothiophene oxide. Typically, 0.2 to 1.0% by weight of the benzothiophene oxide can be added in the non-aqueous electrolyte placed in the battery case (i.e. the non-aqueous electrolyte at the time of placement into the battery case); the same applies hereinafter). The negative electrode comprises a negative current collector and a negative electrode material layer placed on the negative current collector. The negative electrode material layer has a BET specific surface area of 2.0 $m^2$/g to 4.9 $m^2$/g. According to a non-aqueous electrolyte secondary battery constituted as described above, while great battery properties are retained, the resistance increase can be inhibited during high-temperature storage.

The present description also provides a non-aqueous electrolyte (typically a non-aqueous electrolyte solution) for use in a secondary battery. The non-aqueous electrolyte comprises a fluorine atom-containing supporting salt and a benzothiophene oxide. The amount of benzothiophene oxide added (contained) can be typically 0.2 to 1.0% by weight. The non-aqueous electrolyte can inhibit the resistance increase in the secondary battery during high-temperature storage.

The present description further provides a benzothiophene oxide added to a non-aqueous electrolyte. By the use of the oxide as a non-aqueous electrolyte additive, the resistance increase is inhibited while the secondary battery constructed with the non-aqueous electrolyte is stored at a high temperature.

In the present description, the benzothiophene oxide refers to a compound having a structure with a benzothiophene ring and an oxo group (═O) bonded to the sulfur atom (S) constituting the thiophene ring.

In a preferable embodiment of the art disclosed herein, the non-aqueous electrolyte comprises a carbonate-based solvent as a non-aqueous solvent. In a constitution using such a non-aqueous electrolyte, the effect of this invention is preferably obtained. In a more preferable embodiment, the non-aqueous electrolyte comprises, as the non-aqueous solvent, ethylene carbonate and at least either dimethyl carbonate or ethyl methyl carbonate. The fluorine atom-containing supporting salt can typically be a fluorine atom-containing lithium salt.

In a preferable embodiment of the art disclosed herein, the benzothiophene oxide is a compound represented by a formula (1):

[Chem 1]

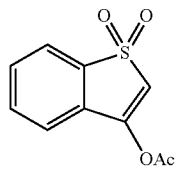

(1)

By the use of a benzothiophene oxide having this structure, the effect of this invention is preferably obtained. In the formula (1), Ac represents an acetyl group ($CH_3CO$—).

In a preferable embodiment of the art disclosed herein, the negative electrode (typically the negative electrode material layer) comprises a carbon material as a negative electrode active material. As the carbon material, natural graphite is preferably used.

In a preferable embodiment of the art disclosed herein, the positive electrode comprises a positive current collector and a positive electrode material layer placed on the positive current collector. The positive electrode (typically the positive electrode material layer) comprises a lithium transition metal composite oxide as a positive electrode active material. As the lithium transition metal composite oxide, a compound represented by a general formula $LiMO_2$ (in the formula, M comprises one, two or more species of transition metal among nickel (Ni), cobalt (Co) and manganese (Mn)) is preferably used.

The non-aqueous electrolyte secondary battery disclosed herein yields excellent high-temperature durability because of the benzothiophene oxide added in the non-aqueous electrolyte. Good battery properties such as low initial resistance can also be retained. Thus, it may show excellent durability, maintaining the input/output performance over a long period. Such a non-aqueous electrolyte secondary battery can be preferably used as a power source for driving a vehicle (e.g. a hybrid automobile (HV), plug-in hybrid automobile (PHV), electric automobile (EV), etc.). The present invention provides a vehicle having a non-aqueous electrolyte secondary battery disclosed herein (which can be in a battery pack form including several connected batteries).

BRIEF DESCRIPTION OF THE DRAWINGS

FIG. 1 shows a schematic cross-sectional view of a lithium secondary battery according to an embodiment.

DETAILED DESCRIPTION OF THE INVENTION

Embodiments of the present invention are described below. The dimensional relationship (length, width, thickness, etc.) in each drawing does not represent the actual dimensional relationship. Besides the matters specifically referred to in this description, other matters necessary to practice this invention (e.g. general techniques related to the battery construction such as the constitution and production method of the electrode body comprising the positive and negative electrodes, constitution and production method of the separator, shape of the battery (case), etc.) may be understood as design matters based on the conventional art in the pertinent field for a person of ordinary skill in the art. The present invention can be practiced based on the contents disclosed in this description and common technical knowledge in the subject field.

Described below are preferable embodiments related to a lithium secondary battery. In this description, the term "secondary battery" generally refers to a battery that can be repeatedly charged and discharged, including storage batteries such as lithium secondary batteries, etc., as well as capacitors such as electric double layer capacitors, etc. The term "lithium secondary battery" in this description refers to a secondary battery that uses lithium ions (Li ions) as the electrolytic ions to bring about charging and discharging by transfer of charge associated with the Li ions between the positive and negative electrodes. Batteries generally called lithium-ion secondary batteries are typical examples included in the lithium secondary battery in this description.

As shown in FIG. 1, a non-aqueous electrolyte secondary battery (or simply a "secondary battery" hereinafter) 100 comprises a battery case 10 and a wound electrode body 20 contained in the battery case 10. A main battery casing 11 of battery case 10 has an opening 12 on the top face. After wound electrode body 20 is placed via opening 12 into battery case 10, the opening 12 is sealed with a lid 14. Battery case 10 further contains a non-aqueous electrolyte solution 25. Lid 14 is provided with an outer positive terminal 38 and an outer negative terminal 48. Terminals 38 and 48 partially protrude from the surface of lid 14. Part of outer positive terminal 38 is connected to an inner positive terminal 37 inside the battery case 10 while part of outer negative terminal 48 is connected to an inner negative terminal 47 inside the battery case 10. These inner terminals 37 and 47 are connected to positive electrode 30 and negative electrode 40 constituting wound electrode body 20, respectively. Material-wise, the battery case (including the lid) can be made of a metal material such as aluminum, etc., or a resin material such as polyphenylenesulfide, etc. The shape of the battery case is not particularly limited and can be cuboid, cylindrical, etc.

Wound electrode body 20 comprises a long sheet of a positive electrode (positive electrode sheet) 30 and a long sheet of a negative electrode (negative electrode sheet) 40. Positive electrode sheet 30 comprises a long sheet of a positive current collector 32 and a positive electrode active material layer 34 formed on at least one (typically each) face thereof. Negative electrode sheet 40 comprises a long sheet of a negative current collector 42 and a negative electrode material layer 44 formed on at least one (typically each) face thereof. Wound electrode body 20 further comprises two long sheets of separator (separator sheets) 50 A and 50B. Positive electrode sheet 30 and negative electrode sheet 40 are layered via two separator sheets 50A and 50B. The layered body is wound in the length direction to form a wound body. The wound body is then laterally compressed and flattened to form a flat shape. The electrode body is not limited to a wound electrode body. Depending on the shape and purpose of the battery, it may have a suitable shape and constitution such as a laminate form, etc.

The respective components of the secondary battery are described next. As the positive current collector constituting the positive electrode (e.g. the positive electrode sheet) in the secondary battery, a conductive material formed of a metal having good conductivity can be preferably used. As such a conductive material, for example, can be used aluminum or an alloy containing aluminum as the primary component. The shape of positive current collector is not particularly limited as it may vary in accordance with the battery shape, etc. It may have a variety of shapes such as, but not particularly limited to, a rod, plate, sheet, foil, mesh, and so on. The thickness of positive current collector is not particularly limited, either, and can be, for instance, 5 μm to 30 μm.

As the positive electrode active material in the positive electrode material layer, various materials known to be usable as positive electrode active materials in lithium secondary batteries can be used without particular limitations. Typically, can be used a lithium transition metal compound comprising lithium (Li) and at least one species of transition metal as metal constituents, and the like. For example, can be used a lithium transition metal composite oxide having a spinel structure or a layered structure (a layered rock salt structure), a polyanionic (e.g. olivine-type) lithium transition metal compound, and the like.

In a preferable embodiment, as the positive electrode active material, a lithium transition metal composite oxide comprising Li and at least one species of Ni, Co or Mn is used. Examples of the composite oxide include a so-called single-transition-metal-type lithium transition metal composite oxide comprising a single species among the transition metals, a so-called two-transition-metal-type lithium transition metal composite oxide comprising two species among the transition metals, a so-called three-transition-metal-type lithium transition metal composite oxide comprising Ni, Co and Mn as transition metals, and a solid solution-type lithium-rich transition metal composite oxide. These can be used singly as one species or in a combination of two or more species. As the positive electrode active material, it is also preferable to use a polyanionic compound represented by a general formula $LiMAO_4$ (herein, M is at least one species of metal selected from a group consisting of iron (Fe), Co, Ni and Mn while A is an atom selected from a group consisting of phosphorous (P), silicon (Si), sulfur (S) and vanadium (V)). In particular, a three-transition-metal-type lithium transition metal composite oxide is preferable. Typical examples of the three-transition-metal-type lithium transition metal composite oxide include three-transition-metal-type lithium transition metal composite oxides represented by a general formula:

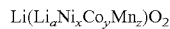

$Li(Li_aNi_xCo_yMn_z)O_2$ (in the formula, a, x, y and z are real numbers satisfying a+x+y+z=1).

The Mn content in the positive electrode active material can be 10% by mole or higher (e.g. 30% by mole or higher) with the total transition metal content in the positive electrode active material being 100% by mole. For example, in a constitution using a positive electrode active material comprising Mn (which is relatively likely to dissolve out in a high temperature environment) in this proportion, by applying the art disclosed herein, the resistance increase can be preferably inhibited during high-temperature storage.

The positive electrode active material may comprise one, two or more species of metal (other than Ni, Co and Mn), such as magnesium (Mg), calcium (Ca), strontium (Sr), titanium (Ti), zirconium (Zr), vanadium (V), niobium (Nb), chromium (Cr), molybdenum (Mo), tungsten (W), iron (Fe), rhodium (Rh), palladium (Pb), platinum (Pt), copper (Cu), zinc (Zn), boron (B), aluminum (Al), gallium (Ga), indium (In), tin (Sn), lanthanum (La), cerium (Ce), etc. The amount of the metal added (included) is not particularly limited. It can be usually 0.01 to 5% by mole (e.g. 0.05 to 2% by mole, typically 0.1 to 0.8% by mole).

As for the shape of the positive electrode active material, a particulate form having an average particle diameter of about 1 μm to 20 μm (e.g. 2 μm to 10 μm) is preferable. In the present description, unless otherwise noted, the term "average particle diameter" refers to the particle diameter at the 50th percentile of the size distribution obtained with a size analyzer based on the laser diffraction/light scattering method, that is, the 50% volume-average particle diameter.

Besides the positive electrode active material, the positive electrode material layer may comprise, as necessary, additives such as a conductive material, binder, etc. As the conductive material, a conductive powdery material such as carbon powder and carbon fiber are preferably used. Preferable examples of carbon powder include various kinds of carbon black, such as acetylene black, furnace black, Ketjen black, graphite powder and the like. Alternatively, among conductive fiber species such as carbon fiber, metal fiber, etc., and powdered metals such as copper, nickel, etc., and organic conductive materials such as polyphenylene derivatives, etc., and the like, solely one species or a mixture of two or more species can be used.

Examples of the binder include various polymer materials. For instance, when the positive electrode material layer is formed with an aqueous composition (a composition wherein water or a solvent mixture primarily comprising water is used as the dispersion medium for active material particles), a water-soluble or water-dispersible polymer material can be preferably used as a binder. Examples of water-soluble or water-dispersible polymer materials include cellulose-based polymers such as carboxymethyl cellulose (CMC), etc.; polyvinyl alcohol (PVA); fluorine-based resins such as polytetrafluoroethylene (PTFE), etc.; vinyl acetate based polymers; rubbers such as styrene-butadiene rubber (SBR), acrylic acid-modified SBR resins (SBR-based latexes), etc.; and the like.

Alternatively, when the positive electrode material layer is formed with a solvent-based composition (a composition primarily using an organic solvent as the dispersion medium for the active material particles), polymeric materials can be used, such as halogenated vinyl resins such as polyvinylidene fluoride (PVdF), etc.; polyalkylene oxides such as polyethylene oxide (PEO), etc.; and the like. These binders can be used singly as one species or in a combination of two or more species. Besides being used as binders, the polymeric materials exemplified above may be used as thickeners, dispersing agents, or other additives.

The positive electrode active material content in the positive electrode material layer exceeds about 50% by weight and is preferably about 70 to 97% by weight (e.g. 75 to 95% by weight). While the additive content in the positive electrode material layer is not particularly limited, the conductive material content is preferably about 1 to 20 parts by weight (e.g. 2 to 12 parts by weight) to 100 parts by weight of the positive electrode active material. The binder content is preferably about 0.8 to 10 parts by weight (e.g. 1 to 5 parts by weight) to 100 parts by weight of the positive electrode active material.

The coating weight per unit area of positive electrode material layer onto the positive current collector (the amount of positive electrode material layer-forming composition applied based on non-volatiles) is not particularly limited. From the standpoint of the battery capacity, etc., it is preferably 3 mg/cm$^2$ or higher (e.g. 10 mg/cm$^2$ or higher, typically 20 mg/cm$^2$ or higher), but 100 mg/cm$^2$ or lower (e.g. 70 mg/cm$^2$ or lower, typically 50 mg/cm$^2$ or lower) per face of positive current collector.

The method for fabricating the positive electrode is not particularly limited. A conventional method can be suitably used. For instance, it can be fabricated as follows: First, a positive electrode active material and, as necessary, a conductive material, binder, etc., are mixed with a suitable solvent to prepare a slurry positive electrode material layer-forming composition. They can be mixed, for instance, using a suitable mixer (planetary mixer, etc.). As the solvent used for preparing the composition, either an aqueous solvent or a non-aqueous solvent can be used. For instance, N-methyl-2-pyrrolidone (NMP) can be used. The resulting composition is applied to a positive current collector and the solvent in the composition is removed. The composition applied to the positive current collector can be compressed as necessary to yield desirable thickness and coating weight. A positive electrode is thus obtained, having a positive electrode material layer formed on the positive current collector. The composition can be applied to the positive current collector, using a suitable applicator such as a die coater, etc. The solvent can be removed by a general drying means (drying by heating, vacuum drying, etc.).

As the negative current collector constituting the negative electrode (e.g. a negative electrode sheet), can be preferably used a conductive member formed of a metal having a good conductivity. For example, can be used copper or an alloy comprising copper as the primary component. The shape of negative current collector is not particularly limited as it may vary in accordance with the shape of the battery, etc. It may be in various forms including shapes of a rod, plate, sheet, foil, mesh, and so on. The thickness of negative current collector is not particularly limited, either. It can be about 5 µm to 30 µm.

The negative electrode material layer comprises a negative electrode active material capable of storing and releasing Li ions serving as charge carriers. The composition or form of the negative electrode active material is not particularly limited. Among materials conventionally used in lithium secondary batteries, one, two or more species can be used. Preferable examples of the negative electrode active material include carbon materials. Typical examples of the carbon materials include graphite carbon (graphite), amorphous carbon and the like. It is preferable to use a particulate carbon material (carbon particles) having a graphite structure (layered structure) at least partially. In particular, the use of a carbon material primarily comprising natural graphite is preferable. The natural graphite may be obtained by spheroidizing graphite flakes. Alternatively, a carbonaceous powder obtained by coating graphite surfaces with an amorphous carbon can be used. Besides these, as the negative electrode active material, an oxide such as lithium titanate and the like, a silicon material or a tin material; or a composite material combining these materials can be used, simply by itself, as an alloy or as a compound. The negative electrode active material content in the negative electrode material layer exceeds about 50% by weight and is preferably about 90 to 99% by weight (e.g. 95 to 99% by weight, typically 97 to 99% by weight).

Besides the negative electrode active material, the negative electrode material layer may comprise as necessary one, two or more species of binder, thickening agent and other additives that can be included in a negative electrode material layer of a general lithium secondary battery. The binder can be various polymeric materials. For instance, with respect to an aqueous composition or a solvent-based composition, those that can be included in the positive electrode material layer can be preferably used. Besides being used as binders, these binders may be used as thickening agents or other additives in the negative electrode material layer-forming composition. The additive content in the negative electrode material layer is not particularly limited while it is preferably about 0.8 to 10% by weight (e.g. about 1 to 5% by weight, typically 1 to 3% by weight).

The form of the negative electrode active material is not particularly limited, but is typically in a particulate or powder form. The BET specific surface area of the particulate negative electrode active material can be selected in a range suitable from the standpoint of the initial resistance, capacity retention, etc. The BET specific surface area can be 1 m$^2$/g or higher (typically 2.5 m$^2$/g or higher, e.g. 2.8 m$^2$/g or higher), but 10 m$^2$/g or lower (typically 3.5 m$^2$/g or lower, e.g. 3.4 m$^2$/g or lower).

The BET specific surface area of the negative electrode material layer disclosed herein is preferably 2 m$^2$/g to 4.9 m$^2$/g. With the BET specific surface area being at or above the prescribed value, the initial resistance can be sufficiently reduced. With the BET specific surface area being at or below the prescribed value, the increase in irreversible capacity is suppressed, leading to excellent capacity retention. The BET specific surface area is not particularly limited when the inhibition of resistance increase during high-temperature storage is important. It can be about 1.5 m$^2$/g or higher (e.g. 1.8 m$^2$/g or higher), but 5.2 m$^2$/g or lower (e.g. 5 m$^2$/g or lower) depending on the required properties such as initial resistance, capacity retention, etc. Alternatively, it can be 2.5 m$^2$/g or higher, but 3.5 m$^2$/g or lower. The BET specific surface area of the negative electrode material layer can be adjusted based on the BET specific surface area of the negative electrode active material.

The BET specific surface area of the negative electrode material layer can be measured as follows: First, a suitable amount of the negative electrode (typically a negative electrode sheet) is cut out. If the negative electrode is obtained upon disassembly of the secondary battery, the negative electrode is washed with a non-aqueous solvent such as ethyl methyl carbonate, etc. From the negative electrode cut-out, the negative electrode material layer is collected with a spatula or the like to use this as a sample. With a specific surface area meter (e.g. "SAP 2010" available from Shimadzu Corporation), upon preliminary drying (under deaeration) at 110° C. for one hour, the specific surface area is measured, using nitrogen as the adsorption gas. The same method is employed in the working examples described later.

The coating weight per unit area of negative electrode material layer onto the negative current collector (the amount of negative electrode material layer-forming composition applied based on non-volatiles) is not particularly limited. From the standpoint of the battery capacity, etc., it is preferably 2 mg/cm² or higher (e.g. 5 mg/cm² or higher, typically 10 mg/cm² or higher), but 50 mg/cm² or lower (e.g. 30 mg/cm² or lower, typically 20 mg/cm² or lower) per face of negative current collector.

The method for fabricating the negative electrode is not particularly limited. For instance, the following method can be used: First, a negative electrode active material and a binder, etc., are mixed with a suitable solvent as described above to prepare a slurry negative electrode material layer-forming composition. As the solvent, either an aqueous solvent or an organic solvent can be used. For instance, water can be used. The resulting composition is then applied to a negative current collector and, via removal of the solvent in the composition, compressed (pressed) if necessary. A negative electrode is thus obtained, having a negative electrode material layer formed on the negative current collector. With respect to other matters (drying, etc.), the same methods as the fabrication of the positive electrode described above can be used.

The separator (separator sheet) placed to separate the positive electrode and negative electrode can be of a material that insulates the positive electrode material layer and negative electrode material layer while allowing the transport of the electrolyte. A preferable example of separator is constituted with a porous polyolefin-based resin. For instance, an about 5 μm to 40 μm thick porous separator sheet formed of a synthetic resin can be preferably used. Such a separator may be a polyolefin sheet having a two-layer or higher multi-layer structure of polyethylene (PE), polypropylene (PP), or a combination of these. The separator sheet may be also provided with, for example, a heat-resistant layer primarily comprising inorganic filler. When the liquid electrolyte is substituted with a solid (gel) electrolyte formed by adding a polymer to the electrolyte, the electrolyte itself may serve as a separator and another separator may not be required.

The non-aqueous electrolyte placed in the secondary battery is characterized by comprising a benzothiophene oxide. The benzothiophene oxide has a benzothiophene ring as described earlier. It has a structure (thiophene oxide structure) in which one or two oxo groups (=O) are bonded to the thiophene ring-constituting sulfur atom (S). To the S, typically two oxo groups are bonded. In this case, the oxide comprises a sulfonyl group represented by —S(O₂)—. The thiophene ring-constituting S is the S in the sulfonyl group. With the oxide having a thiophene oxide structure, a coating is formed from the oxide on the surface of the negative electrode active material. The coating inhibits the resistance increase during high-temperature storage. While it is unnecessary to reveal the reason, it is thought that the resistance increase is inhibited through the ability to accept electrons and the thermal stability based on the thiophene oxide structure.

The benzothiophene oxide has a carbon-carbon double bond in the benzothiophene ring. The carbon-carbon double bond may typically be present in the thiophene ring (e.g. between the second and third carbons) of the oxide. Because of this, the coating derived from the oxide is favorably formed on the surface of the negative electrode active material. More specifically, while not to be particularly taken as limitations, the oxide is thought to undergo a reaction (polymerization) in the non-aqueous electrolyte, for instance, during aging and the like to form a coating on the negative electrode active material surface before a highly resistive coating is formed. The highly resistive coating is formed due to the fluorine atoms in the non-aqueous electrolyte and is not preferable in view that if it degrades and peels off the negative electrode active material surface, it will invite formation of a new highly resistive coating in this region. The addition of the benzothiophene oxide is thought to hinder the formation of a highly resistive coating as described above.

In the benzothiophene oxide disclosed herein, the benzothiophene ring can have a substituent as far as the effect of the present invention is not impaired. Examples of the substituent include a linear or branched alkyl group (e.g. methyl group, ethyl group) with one to four carbon atoms; an alkenyl group (vinyl group, etc.); an aromatic group such as phenyl group, etc.; a halogen group such as bromo group, etc.; an oxo group; and the like. The alkyl group, alkenyl group and aromatic group may be linked to the benzothiophene ring via an ether (—O—) or ester (—OOC—) bond. When the benzothiophene oxide has substituent(s) as described above, the number of substituents can be about one, two or three. From the standpoint of the ease of synthesis, etc., the substituent may be bonded, for instance, to the third carbon. The oxide may have a dibenzothiophene oxide structure further comprising another benzene ring that shares a side with the thiophene ring.

In a particularly preferable embodiment, as the benzothiophene oxide, a compound represented by the formula (1) is used:

[Chem 2]

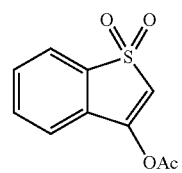

(1)

A benzothiophene oxide having a structure as described above can be synthesized, for instance, by the following procedures:

[Chem 3]

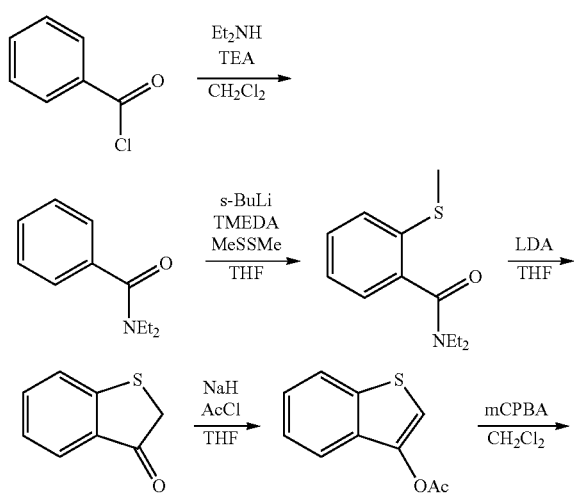

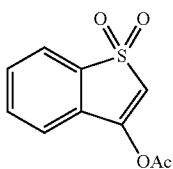

It is typically preferable that 0.2 to 1.0% by weight of the benzothiophene oxide is added in the non-aqueous electrolyte placed in the secondary battery (i.e. the non-aqueous electrolyte at the time of placement into the secondary battery); the same applies hereinafter). When the amount of the oxide added is at or above the prescribed value, the effect of adding the benzothiophene oxide is sufficiently produced to inhibit the resistance increase during high-temperature storage. When the amount of the oxide added is at or below the prescribed value, the resistance increase caused by the oxide added in excess is inhibited. From the standpoint of inhibiting the resistance increase, the amount of the oxide added is preferably 0.3% by weight or greater, more preferably 0.4% by weight or greater, yet more preferably 0.5% by weight or greater, or particularly preferably 0.7% by weight or greater. In view of the balance between the inhibition of resistance increase and other battery properties, it can be about 0.8% by weight or less (e.g. 0.6% by weight or less).

From the standpoint of combining inhibition of resistance increase during high-temperature storage with other battery properties (capacity retention, initial resistance, etc.) at a good balance, it is preferable that the negative electrode material layer has a BET specific surface area X (m²/g) and the benzothiophene oxide is added in an amount of Y (% by weight) in the non-aqueous electrolyte placed in the secondary battery, with X and Y satisfying the relationship of an inequality Y≤0.21X−0.02. It is preferable that X and Y satisfy the relationship of an inequality Y≥0.1X.

The non-aqueous electrolyte placed in the secondary battery comprises a non-aqueous solvent and a supporting salt. A typical example is a non-aqueous electrolyte solution having a composition that contains a supporting salt in a suitable non-aqueous solvent. The non-aqueous electrolyte solution is in a liquid state at normal temperature (e.g. 25° C.). In a preferable embodiment, it is always in a liquid state in the use environment of the battery (e.g. in an environment at a temperature of 0° C. to 60° C.).

As the non-aqueous solvent, organic solvents can be used, such as carbonates, ethers, esters, nitriles, sulfones, lactones and the like that are used in electrolyte solutions of general non-aqueous electrolyte secondary batteries. Examples include ethylene carbonate (EC), propylene carbonate (PC), diethyl carbonate (DEC), dimethyl carbonate (DMC), vinylene carbonate, ethyl methyl carbonate (EMC), 1,2-dimethoxyethane, 1,2-diethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformamide, dimethylsulfoxide, sulfolane, γ-butyrolactone, etc.; and fluorination products of these (preferably fluorinated carbonates such as monofluoroethylene carbonate (MFEC), difluoroethylene carbonate (DFEC)). These can be used solely as one species or as a mixture of two or more species.

Preferable examples of the non-aqueous solvent include carbonate-based solvents. The carbonate-based solvent herein refers to a non-aqueous solvent in which the total volume of carbonate(s) accounts for 60% by volume or higher (more preferably 75% by volume or higher, yet more preferably 90% by volume or higher, or even essentially 100% by volume) of the total volume of the non-aqueous solvent.

As the carbonate, from the standpoint of the electrical conductivity, electrochemical stability, etc., the combined use of a cyclic carbonate and an acyclic carbonate is preferable. For instance, the mixing ratio of cyclic carbonate to acyclic carbonate is preferably in a range of 20:80 to 40:60 by volume. As the cyclic carbonate, EC and PC are preferable, with EC being particularly preferable. As the acyclic carbonate, DEC, DMC and EMC are preferable. Among them, DMC and EMC are particularly preferable. When DMC and/or EMC are used as the cyclic carbonate, the mixing ratio of DMC to EMC is 0:100 to 100:0 by volume, or preferably 20:80 to 80:20 (e.g. 40:60 to 70:30, typically 50:50 to 65:35).

As the supporting salt, a fluorine atom-containing supporting salt (e.g. an alkali metal salt, alkaline earth metal salt) is used. According to the art disclosed herein, in a constitution using a non-aqueous electrolyte comprising a fluorine atom-containing supporting salt, addition of a benzothiophene oxide inhibits the resistance increase during high-temperature storage. In an embodiment of a lithium secondary battery, the supporting salt is typically a fluorine atom-containing lithium salt (lithium compound). Specific examples of the fluorine atom-containing lithium salt include $LiPF_6$, $LiBF_4$, $LiAsF_6$, $LiCF_3SO_3$, $LiC_4F_9SO_3$, $Li(CF_3SO_2)_2N$, $LiC(CF_3SO_2)_3$, $LiSiF_6$ and the like. These can be used singly as one species or in a combination of two or more species. Typical examples include $LiPF_6$ and $LiBF_4$. The non-aqueous electrolyte disclosed herein may comprise a fluorine atom-free supporting salt in addition to the fluorine atom-containing supporting salt.

The concentration of the supporting salt in the non-aqueous electrolyte can be suitably selected based on the technical common knowledge among those skilled in the art. The concentration is preferably in a range of about 0.1 mol/L to 5 mol/L (e.g. 0.5 mol/L to 3 mol/L, typically 0.8 mol/L to 1.5 mol/L).

The non-aqueous electrolyte may comprise optional additives as necessary as far as the effect of the present invention is not impaired. The additives may be used for one, two or more purposes, such as increasing the battery's output performance, increasing the storability (inhibiting capacity degradation during storage, etc.), increasing the cycle characteristics, increasing the initial charging/discharging efficiency, and so on. Examples of preferable additive include fluorophosphates (preferably difluorophosphates, e.g. lithium difluorophosphate represented by $LiPO_2F_2$), lithium bis(oxalato)borate (LiBOB), etc. Other usable examples include additives such as cyclohexylbenzene, biphenyl, etc., which can be used to prevent overcharging.

In a secondary battery constructed with the non-aqueous electrolyte disclosed herein, a coating derived from the benzothiophene oxide is formed on the surface of the negative electrode active material. This allows for inhibition of the resistance increase during high-temperature storage caused by a highly resistive coating. The highly resistive coating is presumably formed due to the fluorine atoms in the non-aqueous electrolyte. Thus, the effect of the art disclosed herein is suitably produced in the secondary battery using a fluorine atom-containing non-aqueous electrolyte. The art disclosed herein provides a non-aqueous electrolyte secondary battery comprising a positive electrode, a negative electrode, and a battery case housing the positive and negative electrodes. In the secondary battery, a non-aqueous electrolyte is contained in the battery case. The negative electrode comprises a negative electrode active material. A coating derived from a benzothiophene oxide is formed on the surface of the negative electrode active material.

The presence of the coating (precipitate) derived from the benzothiophene oxide disclosed herein can be confirmed, for instance, by subjecting a specimen that has been collected from the negative electrode surface and washed with a suitable solvent (e.g. EMC) to analysis by heretofore known ICP-AES (inductively coupled plasma-atomic emission spectrometry), and so on.

EXAMPLES

Several worked examples relating to the present invention are described below, but the present invention is not intended to be limited to these examples. In the description below, "parts" and "%" are by weight unless otherwise specified.

Examples 1-8

[Fabrication of Positive Electrode]

With NMP, were mixed $LiNi_{0.33}Co_{0.33}Mn_{0.33}O_2$ as a positive electrode active material, acetylene black as a conductive material and PVdF as a binder at a weight ratio of these materials of 90:8:2 to prepare a slurry positive electrode material layer-forming composition. The composition was applied to each face of aluminum foil (15 μm thick), allowed to dry and pressed to fabricate a positive electrode sheet provided with a positive electrode material layer on each face of positive current collector. The coating weight of positive electrode material layer per face was 30 mg/cm$^2$ (based on non-volatiles).

[Fabrication of Negative Electrode]

With ion-exchanged water, were mixed a natural graphite powder as a negative electrode active material, SBR as a binder and CMC as a dispersing agent at a weight ratio of these materials of 98:1:1 to prepare a slurry negative electrode material layer-forming composition. The composition was applied to each face of copper foil (10 μm thick), allowed to dry and pressed to fabricate a negative electrode sheet provided with a negative electrode material layer on each face of negative current collector. The coating weight of negative electrode material layer per face was 15 mg/cm$^2$. The BET specific surface areas of negative electrode material layers according to the respective examples were adjusted to the values shown in Table 1, using negative electrode active materials having varied BET specific surface areas.

[Construction of Lithium Secondary Battery]

The fabricated positive and negative electrode sheets were wound along with two separator sheets to fabricate a wound electrode body. As the separator sheet, was used a three-layer sheet with a PP layer laminated on each face of a PE layer. To the edges of positive and negative current collectors in the wound electrode body, electrode terminals were connected. The resultant was placed in a battery case made of aluminum. A non-aqueous electrolyte solution was then injected and the case was sealed to construct a 18650 cylindrical lithium secondary battery.

The non-aqueous electrolyte solutions were prepared by dissolving $LiPF_6$ to a concentration of 1.1 mol/L in a solvent mixture comprising EC, DMC and EMC at a volume ratio of 30:40:30, followed by addition of the benzothiophene oxide represented by the formula (1) in amounts shown in Table 1.

[Measurement of Initial Capacity]

After aged, the secondary batteries of the respective examples were subjected to initial capacity measurement over 3.0 V to 4.1 V voltage range at a temperature of 25° C., according to the following Steps 1 to 3:

(Step 1) constant-current (CC) discharging at ⅓ C to 3.0 V followed by constant-voltage (CV) discharging for two hours followed by a 10 minute break.

(Step 2) CC charging at ⅓ C to 4.1 V followed by CV charging to a current equivalent to 1/100 C followed by a 10 minute break.

(Step 3) CC discharging at ⅓ C to 3.0 V followed by CV discharging to a current equivalent to 1/100 C followed by a 10 minute break.

The discharge capacity (CCCV discharge capacity) measured from the CC discharging through the CV discharging in Step 3 was recorded as the initial capacity.

[Measurement of Initial Resistance (IV Resistance)]

The secondary battery according to each example was CC-charged at a temperature of 25° C. to 60% SOC. Each battery adjusted to 60% SOC was CC-discharged at a discharge rate of 10 C to 3 V and the voltage drop was measured during the first 10 seconds of the discharge. The measured value of voltage drop (V) was divided by the corresponding current value to determine the IV resistance (mΩ). The average value was recorded as the initial resistance. The results are shown in Table 1.

[High-temperature Storage Test]

The secondary battery according to each example was CC-charged at a temperature of 25° C. to 85% SOC. Each battery adjusted to 85% SOC was stored in a thermostat oven at a temperature of 60° C. for 90 days. After the completion of the test, the battery was removed from the thermostat oven and measured for battery capacity and IV resistance in an environment at a temperature of 25° C. in the same manner as the initial resistance measurement. The value after the high-temperature storage test was divided by the initial value to determine the capacity retention (%) and resistance increase (%). The results are shown in Table 1.

TABLE 1

|  | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- |
| Amount of benzothiophene oxide added (wt. %) | 0.2 | 0.4 | 0.5 | 1.0 | 0.1 | 1.2 | 0.4 | 1.0 |
| BET specific surface area of negative electrode material layer (m$^2$/g) | 2.0 | 2.0 | 4.9 | 4.9 | 3.0 | 3.0 | 1.0 | 5.5 |
| Initial resistance (mΩ) | 24 | 23 | 22 | 22 | 20 | 22 | 60 | 24 |

TABLE 1-continued

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| % resistance increase | 105 | 103 | 104 | 103 | 152 | 124 | 103 | 105 |
| % capacity retention | 89 | 91 | 92 | 92 | 87 | 92 | 91 | 80 |

As shown in Table 1, the secondary batteries according to Examples 1 to 4 exhibited low levels of initial resistance as well as excellent capacity retention after high-temperature storage, and even the resistance increase was inhibited during the high-temperature storage. On the other hand, with respect to Example 5 in which less than 0.2% by weight of the benzothiophene oxide was added, an increase in resistance was observed during the high-temperature storage. In Example 6 where more than 1.0% by weight of the benzothiophene oxide was added, the resistance increase was relatively steep after the high-temperature storage. In Example 7 wherein the negative electrode material layers had a BET specific surface area lower than 2.0 m²/g, the initial resistance was twice or greater than twice the values of Examples 1 to 4. In Example 8 wherein the negative electrode material layer's BET specific surface area was higher than 4.9 m²/g, the capacity retention had a tendency to decrease after high-temperature storage.

From these results, it is thought that with certain amounts of the benzothiophene oxide added to the non-aqueous electrolytes, some coatings were formed from the benzothiophene oxide on the surfaces of the negative electrode active materials and the resistance increase was inhibited during high-temperature storage.

Although specific embodiments of the present invention have been described in detail above, these are merely for illustrations and do not limit the scope of the claims. The invention disclosed herein includes various modifications and changes made to the specific embodiments illustrated above.

REFERENCE SIGNS LIST

10 battery case
25 non-aqueous electrolyte solution
30 positive electrode (positive electrode sheet)
32 positive current collector
34 positive electrode material layer
40 negative electrode (negative electrode sheet)
42 negative current collector
44 negative electrode material layer
50A, 50B separators
100 lithium secondary battery

What is claimed is:

1. A method for producing a non-aqueous electrolyte secondary battery, the method comprising:
   a step of obtaining a positive electrode, a negative electrode and a non-aqueous electrolyte; and
   a step of placing the positive electrode, the negative electrode and the non-aqueous electrolyte in a battery case,
   wherein,
   the non-aqueous electrolyte comprises a fluorine atom-containing supporting salt and a benzothiophene oxide represented by formula (1):

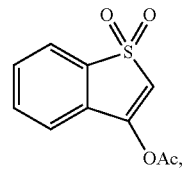

the benzothiophene oxide is added in an amount of 0.2% by weight to 1.0% by weight in the non-aqueous electrolyte,
the negative electrode comprises a negative current collector and a negative electrode material layer placed on the negative current collector, and
the negative electrode material layer has a BET specific surface area of 2.0 m²/g to 4.9 m²/g.

2. The method according to claim 1, wherein the non-aqueous electrolyte comprises a carbonate-based solvent as a non-aqueous solvent.

3. The method according to claim 1, wherein the non-aqueous electrolyte comprises ethylene carbonate and at least either dimethyl carbonate or ethyl methyl carbonate as non-aqueous solvents.

4. The method according to claim 1, wherein the fluorine atom-containing supporting salt is a fluorine atom-containing lithium salt.

5. A non-aqueous electrolyte secondary battery comprising a positive electrode, a negative electrode, and a battery case housing the positive and negative electrodes,
   wherein
   a non-aqueous electrolyte is contained in the battery case,
   the non-aqueous electrolyte placed in the battery case comprises a fluorine atom-containing supporting salt and a benzothiophene oxide represented by formula (1):

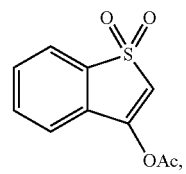

the benzothiophene oxide is added in an amount of 0.2 to 1.0% by weight in the non-aqueous electrolyte placed in the battery case,
the negative electrode comprises a negative current collector and a negative electrode material layer placed on the negative current collector, and
the negative electrode material layer has a BET specific surface area of 2.0 m²/g to 4.9 m²/g.

6. A vehicle comprising the non-aqueous electrolyte secondary battery according to claim 5.

7. A non-aqueous electrolyte for use in a secondary battery, comprising a fluorine atom-containing supporting salt and a benzothiophene oxide represented by formula (1):

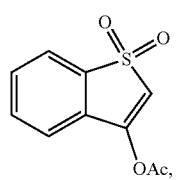 (1)
wherein the benzothiophene oxide content is 0.2% by weight to 1.0% by weight.
* * * * *